United States Patent
Li et al.

(10) Patent No.: US 9,178,825 B2
(45) Date of Patent: Nov. 3, 2015

(54) DATA PROCESSING METHOD AND APPARATUS

(71) Applicant: Huawei Technologies Co., Ltd., Shenzhen (CN)

(72) Inventors: Hai Li, Chengdu (CN); Huaping Shi, Chengdu (CN); Yanzhao Pang, Chengdu (CN); Christian Mazzucco, Milan (IT); Sergio Bianchi, Milan (IT); Xianfeng Li, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 28 days.

(21) Appl. No.: 14/186,960

(22) Filed: Feb. 21, 2014

(65) Prior Publication Data

US 2014/0173143 A1    Jun. 19, 2014

Related U.S. Application Data

(63) Continuation of application No. PCT/CN2012/085966, filed on Dec. 5, 2012.

(51) Int. Cl.
*H04L 7/00*        (2006.01)
*H04L 12/801*    (2013.01)
(Continued)

(52) U.S. Cl.
CPC ............... *H04L 47/10* (2013.01); *H04L 25/49* (2013.01); *H04L 27/38* (2013.01)

(58) Field of Classification Search
CPC .......... H04L 25/49; H04L 27/38; H04L 47/10
See application file for complete search history.

(56) References Cited

U.S. PATENT DOCUMENTS

| | | | |
|---|---|---|---|
| 2001/0051504 A1 | 12/2001 | Kubo et al. | |
| 2003/0184374 A1* | 10/2003 | Huang | H03F 1/3247 330/149 |
| 2007/0241812 A1 | 10/2007 | Yang et al. | |

(Continued)

FOREIGN PATENT DOCUMENTS

| | | |
|---|---|---|
| CN | 101355536 A | 1/2009 |
| CN | 101640925 A | 2/2010 |

(Continued)

OTHER PUBLICATIONS

Chinese Office Action received in Application No. 20128002127.6 mailed Jan. 29, 2015, 7 pages.

(Continued)

*Primary Examiner* — Syed Haider
(74) *Attorney, Agent, or Firm* — Slater & Matsil, L.L.P.

(57) ABSTRACT

The present invention relates to the field of communications technologies and discloses a data processing method and apparatus to obtain a DPD non-linear distortion compensation coefficient under a QPSK mode. The embodiments of the present invention receive a first data flow, and perform interpolation into the first data flow to obtain a second data flow; receive a third data flow, and calculate a data flow signal quality difference between the third data flow and the second data flow; and obtain a DPD non-linear distortion compensation coefficient according to the data flow signal quality difference and the third data flow or the second data flow. The embodiments of the present invention are applicable to the scenarios of obtaining a DPD non-linear distortion compensation coefficient in QPSK mode.

14 Claims, 8 Drawing Sheets

(51) Int. Cl.
*H04L 25/49* (2006.01)
*H04L 27/38* (2006.01)

(56) References Cited

U.S. PATENT DOCUMENTS

2009/0129257 A1* 5/2009 Maltsev ............... H03F 1/0205
 370/208
2010/0026354 A1 2/2010 Utsunomiya et al.
2010/0159856 A1* 6/2010 Kato et al. ............... 455/114.3
2010/0279617 A1* 11/2010 Osman ..................... 455/63.1

FOREIGN PATENT DOCUMENTS

| | | | |
|---|---|---|---|
| CN | 102045277 | A | 5/2011 |
| CN | 102075496 | A | 5/2011 |
| CN | 102148783 | A | 8/2011 |
| EP | 2149991 | A2 | 2/2010 |

OTHER PUBLICATIONS

"PCT International Search Report," International Application No. PCT/CN2012/085966, Sep. 12, 2013, 10 pages.

* cited by examiner (1) Constellation map          (2) Time domain map (1) Constellation map    (2) Time domain map

DATA PROCESSING METHOD AND APPARATUS

This application is a continuation of International Application No. PCT/CN2012/085966, filed on Dec. 5, 2012, which is hereby incorporated by reference in its entirety.

TECHNICAL FIELD

Embodiments of the present invention relate to the field of communications technologies, and in particular, to a data processing method and apparatus.

BACKGROUND

In a microwave system, modulation signals have different amplitudes on the time domain, and suffer different non-linear distortion after passing through a PA (Power Amplifier, power amplifier) device. According to the distortion condition, a digital pre-distortion (Digital Pre-Distortion, DPD) non-linear distortion compensation coefficient is obtained, and the DPD non-linear distortion compensation coefficient is added in the data flow that passes through the PA device. After undergoing power amplification, the data flow counteracts the non-linear features of the PA device, thereby implementing non-linear distortion counteraction of the PA device and making the gain curve of the PA device closer to an ideal curve.

In the prior art, a receiving device receives different signal-distorted data flows generated after the data flows pass through the PA device, and a hard decision module determines the actual position (that is, actual constellation point) of each symbol on the constellation map according to the position of each constellation point on the constellation map corresponding to the modulation mode of the data flow, where each symbol corresponds to each piece of data in the data flow. After being processed by the hard decision module, the data flow enters the DPD. At the DPD, a pre-distortion parameter is obtained according to the difference between the ideal constellation point and the actual constellation point, so that the non-linear distortion of the PA device can be counteracted according to the pre-distortion parameter.

However, when the modulation mode is QPSK (Quadrature Phase Shift Keying, quadrature phase shift keying), the amplitude on the time domain does not differ between modulation signals. Consequently, the DPD non-linear distortion compensation coefficient in QPSK mode is not available according to the prior art.

SUMMARY OF THE INVENTION

Embodiments of the present invention provide a data processing method and apparatus to obtain a DPD non-linear distortion compensation coefficient under a QPSK mode.

In a first aspect, the present invention provides a data processing method, including receiving a first data flow, and performing interpolation into the first data flow to obtain a second data flow, receiving a third data flow, and calculating a data flow signal quality difference between the third data flow and the second data flow, and obtaining a DPD non-linear distortion compensation coefficient according to the data flow signal quality difference and the third data flow or the second data flow.

In a first possible embodiment, with reference to the first aspect, the first data flow is a 1× symbol rate data flow obtained after a 2× symbol rate quadrature phase shift keying QPSK modulation signal undergoes frame synchronization adjustment, balancing, data extraction, and position determining on the constellation map, and the third data flow is a 2× symbol rate data flow obtained after the 2× symbol rate QPSK modulation signal undergoes frame synchronization adjustment and balancing.

In a second possible embodiment, with reference to the first possible embodiment in the first aspect, the performing interpolation into the first data flow to obtain a second data flow includes performing interpolation into the first data flow of a 1× symbol rate to obtain the second data flow of a 2× symbol rate.

In a third possible embodiment, with reference to the second possible embodiment in the first aspect, the performing interpolation into the first data flow to obtain a second data flow includes interpolating a preset value between every two data symbols in the first data flow of a 1× symbol rate, and performing anti-aliasing filtering for the data flow with the interpolated preset value to obtain the second data flow of a 2× symbol rate.

In a fourth possible embodiment, with reference to the first aspect or the first possible embodiment or the second possible embodiment or the third possible embodiment in the first aspect, after receiving the third data flow and before calculating the data flow signal quality difference between the third data flow and the second data flow, the method further includes removing the distortion compensation caused by the balancing onto data distortion in the third data flow to obtain real data distortion.

In a fifth possible embodiment, with reference to the first aspect or the first possible embodiment or the second possible embodiment or the third possible embodiment or the fourth possible embodiment in the first aspect, after receiving the third data flow and before calculating the data flow signal quality difference between the third data flow and the second data flow, the method further includes calculating a delay difference between the third data flow and the second data flow, and performing delay alignment between the third data flow and the second data flow according to the delay difference.

In a sixth possible embodiment, with reference to the fifth possible embodiment in the first aspect, the calculating a data flow signal quality difference between the third data flow and the second data flow includes determining an actual symbol point corresponding to the third data flow and an ideal symbol point corresponding to the second data flow after the delay alignment, and calculating a data flow signal quality difference between the actual symbol point and the ideal symbol point.

In a second aspect, the present invention provides a data processing apparatus, including an interpolating and filtering module, configured to receive a first data flow, and perform interpolation into the first data flow to obtain a second data flow, a calculating module, configured to receive a third data flow, and calculate a data flow signal quality difference between the third data flow and the second data flow, and an obtaining module, configured to obtain a DPD non-linear distortion compensation coefficient according to the data flow signal quality difference and the third data flow or the second data flow.

In a first possible embodiment, with reference to the second aspect, the first data flow is a 1× symbol rate data flow obtained after a 2× symbol rate quadrature phase shift keying QPSK modulation signal undergoes frame synchronization adjustment, balancing, data extraction, and position determining on the constellation map, and the third data flow is a 2× symbol rate data flow obtained after the 2× symbol rate QPSK modulation signal undergoes frame synchronization adjustment and balancing.

In a second possible embodiment, with reference to the first possible embodiment in the second aspect, the interpolating and filtering module is specifically configured to perform interpolation into the first data flow of a 1× symbol rate to obtain the second data flow of a 2× symbol rate.

In a third possible embodiment, with reference to the second possible embodiment in the second aspect, the interpolating and filtering module includes an interpolating unit, configured to interpolate a preset value between every two data symbols in the first data flow of a 1× symbol rate, and a filtering unit, configured to perform anti-aliasing filtering for the data flow with the interpolated preset value to obtain the second data flow of a 2× symbol rate.

In a fourth possible embodiment, with reference to the second aspect or the first possible embodiment or the second possible embodiment or the third possible embodiment in the second aspect, the apparatus further includes a de-balancer, configured to remove the distortion compensation caused by the balancing onto data distortion in the third data flow to obtain real data distortion.

In a fifth possible embodiment, with reference to the second aspect or the first possible embodiment or the second possible embodiment or the third possible embodiment or the fourth possible embodiment in the second aspect, the apparatus further includes the calculating module is further configured to calculate a delay difference between the third data flow and the second data flow, and the apparatus further includes a processing module, configured to perform delay alignment between the third data flow and the second data flow according to the delay difference.

In a sixth possible embodiment, with reference to the fifth possible embodiment in the second aspect, the calculating module includes a determining unit, configured to determine an actual symbol point corresponding to the third data flow and an ideal symbol point corresponding to the second data flow after the delay alignment, and a calculating unit, configured to calculate a data flow signal quality difference between the actual symbol point and the ideal symbol point.

In a third aspect, the present invention provides a receiving device, including at least a frame synchronization module, a balancer, an extracting module, a hard decision module, and any data processing apparatus provided in the second aspect, where the frame synchronization module is configured to perform symbol clock recovery and frame header alignment for a received data flow, the balancer is configured to perform distortion compensation for the data flow processed by the frame synchronization module, the extracting module is configured to perform data extraction for the data flow processed by the balancer, and the hard decision module is configured to determine a constellation point for a symbol corresponding to the data flow processed by the extracting module to obtain a first data flow.

In a fourth aspect, the present invention provides a data processing system, including at least a sending device and any receiving device that is provided in the third aspect, where the sending device is configured to receive a DPD non-linear distortion compensation coefficient sent by the receiving device, convert the DPD non-linear distortion compensation coefficient into a data flow for implementing pre-distortion compensation, amplify power of the data flow, and output the amplified data flow.

In the data processing method and apparatus provided in the embodiments of the present invention, the first data flow is received, and a value is interpolated into the first data flow to obtain the second data flow; the third data flow is received, and the data flow signal quality difference between the third data flow and the second data flow is calculated; and the DPD non-linear distortion compensation coefficient is obtained according to the data flow signal quality difference and the third data flow or the second data flow. In the prior art, when the modulation mode is QPSK, the amplitude on the time domain does not differ between the modulation signals, which leads to failure of obtaining the DPD non-linear distortion compensation coefficient in QPSK mode. Compared with the prior art, the embodiments of the present invention perform interpolation into the first data flow to obtain the second data flow, and therefore, when the modulation mode is QPSK, the amplitude on the time domain differs between the modulation signals, so that the DPD non-linear distortion compensation coefficient can be obtained by using the second data flow and the third data flow in QPSK mode.

BRIEF DESCRIPTION OF THE DRAWINGS

For a more complete understanding of the present invention, and the advantages thereof, reference is now made to the following descriptions taken in conjunction with the accompanying drawings, in which:

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2(2) is a schematic diagram of a time domain map corresponding to a QPSK modulation signal according to Embodiment 1 of the present invention;

FIG. 3(2) is a schematic diagram of a time domain map corresponding to another type of QPSK modulation signal according to Embodiment 1 of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
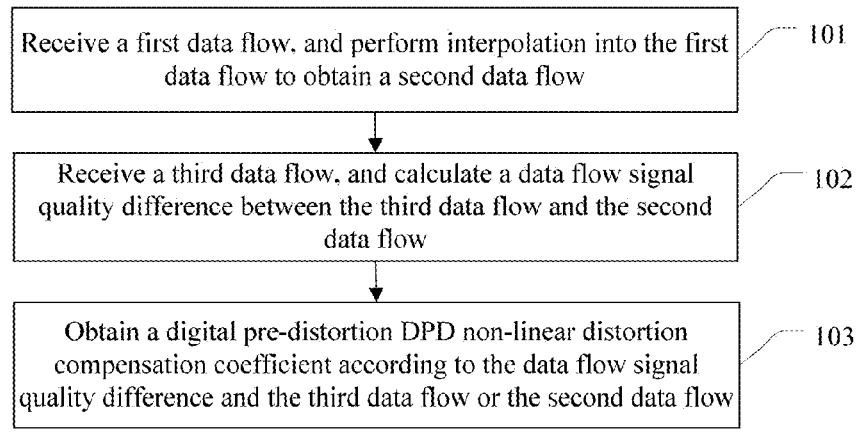
FIG. 1 is a flowchart of a data processing method according to Embodiment 1 of the present invention.

This embodiment of the present invention provides a data processing method. As shown in FIG. 1, the method includes the following steps:

Step 101: Receive a first data flow, and perform interpolation into the first data flow to obtain a second data flow.

The first data flow is a 1× symbol rate data flow obtained after a 2× symbol rate quadrature phase shift keying (Quadrature Phase Shift Keying, QPSK) modulation signal undergoes frame synchronization adjustment, balancing, data extraction, and position determining on the constellation map. When the first data flow undergoes frame synchronization adjustment and balancing, the first data flow is a 2× symbol rate data flow; and, through data extraction of the first data flow, the 2× symbol rate data flow is condensed into a 1× symbol rate data flow. In hard decision processing, that is, in determining the position on the constellation map, 1× symbol rate is required. Therefore, the 2× symbol rate data flow needs to be condensed into a 1× symbol rate data flow.

In this step, a value is interpolated into the first data flow to obtain a second data flow, so that the first data flow of a 1× symbol rate changes to a second data flow of a 2× symbol rate.

Figure 2:
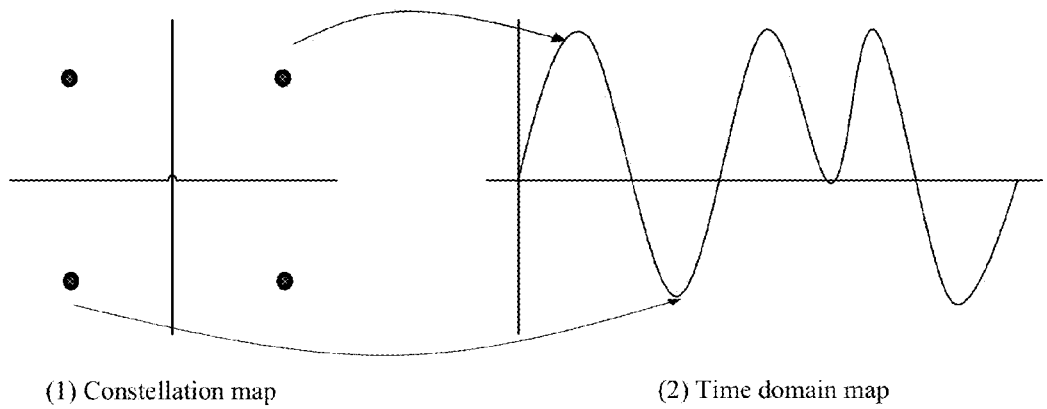
FIG. 2(1) is a schematic diagram of a position of a symbol corresponding to QPSK in a constellation map according to Embodiment 1 of the present invention.
Figure 3:
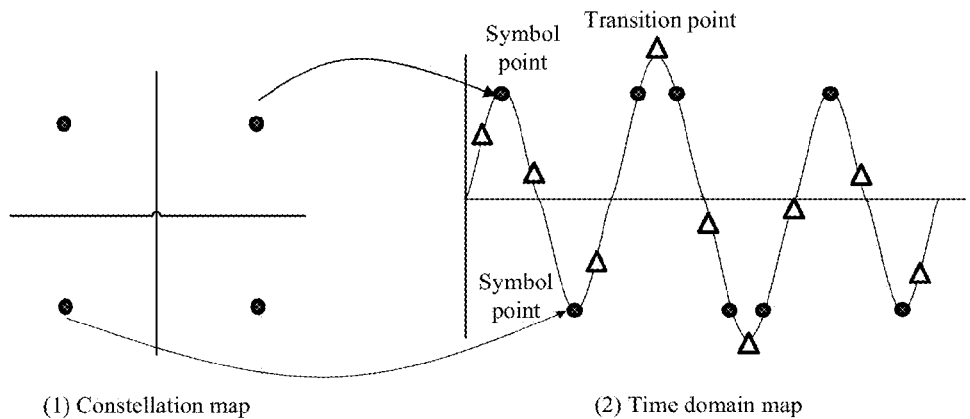
FIG. 3(1) is a schematic diagram of a position of a symbol corresponding to another type of QPSK in a constellation map according to Embodiment 1 of the present invention.

QPSK is a digital modulation mode. In the modulation modes of digital signals, QPSK is a common satellite digital signal modulation mode characterized by a high spectrum usage and high interference resistance. As shown in FIG. 2, FIG. 2(1) illustrates the position of the symbol corresponding to the QPSK on the constellation map, and FIG. 2(2) illustrates the time domain map corresponding to the QPSK modulation signal. Evidently, the amplitude on the time domain does not differ between the QPSK modulation signals. Consequently, the power amplification response under different input amplitudes cannot be determined, and the non-linear distortion compensation coefficient cannot be calculated. Before the interpolation operation, a symbol point, from which real signal information can be extracted, exists in the first data flow; after completion of interpolation, a transition point, which is generated out of the interpolation, exists in the second data flow, where the transition point is located in a middle position between two adjacent symbol points in the time domain map. As shown in FIG. 3, FIG. 3(1) illustrates the position of the symbol corresponding to the QPSK on the constellation map, and FIG. 3(2) illustrates the time domain map corresponding to the QPSK modulation signal, where a symbol point is denoted by a circle and a transition point is denoted by a triangle. In this way, on the time domain map corresponding to the QPSK modulation signal, the amplitude differs, which provides a basis for calculating the DPD non-linear distortion compensation coefficient.

Step 102: Receive a third data flow, and calculate a data flow signal quality difference between the third data flow and the second data flow.

The third data flow is a 2× symbol rate data flow obtained after the 2× symbol rate QPSK modulation signal undergoes frame synchronization adjustment and balancing.

In step 101, a value is interpolated into the first data flow to obtain a second data flow of a 2× symbol rate, and the third data flow is a data flow of a 2× symbol rate. In this way, both the second data flow and the third data flow work under the 2× symbol rate, which facilitates subsequent processing for the data flows.

The third data flow is a data flow that has undergone frame synchronization adjustment and balancing but without further processing, and therefore, is distorted greatly. The second data flow is a data flow that has undergone frame synchronization adjustment, balancing, data extraction, and position determining on the constellation map, and therefore has a low distortion. Therefore, according to difference of distortion between the third data flow and the second data flow, the data flow signal quality difference between the two can be calculated.

Step 103: Obtain a DPD non-linear distortion compensation coefficient according to the data flow signal quality difference and the third data flow or the second data flow.

Optionally, according to the LMS algorithm principles, the DPD non-linear distortion compensation coefficient can be calculated corresponding to the data flow signal quality difference between the third data flow and the second data flow by using the second data flow or the third data flow as fundamental data. It should be noted that the second data flow differs from the third data flow only in data performance, and both can be used as a basis for calculating the DPD non-linear distortion compensation coefficient.

In the data processing method provided in the embodiment of the present invention, a value is interpolated into the first data flow to obtain a second data stream. Therefore, when the modulation mode is QPSK, the amplitude on the time domain differs between modulation signals, so that the DPD non-linear distortion compensation coefficient in QPSK mode can be obtained by using the second data flow and the third data flow.

Figure 4:
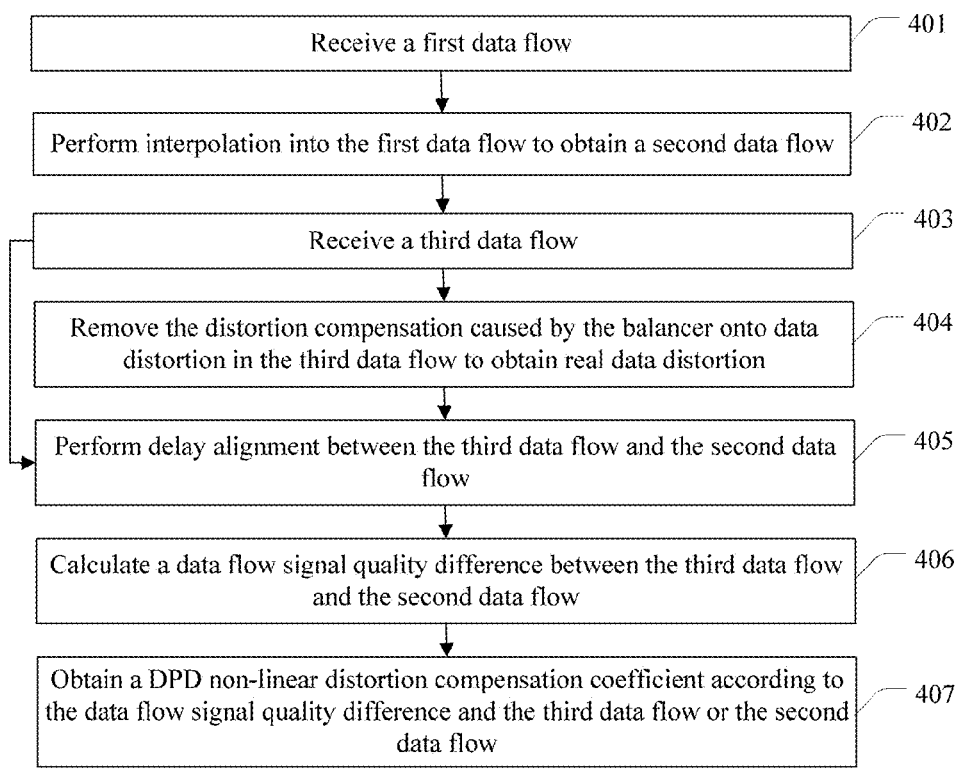
FIG. 4 is a flowchart of another data processing method according to Embodiment 1 of the present invention.

An embodiment of the present invention provides another data processing method. As shown in FIG. 4, the method includes the following steps:

Step 401: Receive a first data flow.

Optionally, the first data flow is a 1× symbol rate data flow obtained after a 2× symbol rate quadrature phase shift keying QPSK modulation signal undergoes frame synchronization adjustment, balancing, data extraction, and position determining on the constellation map.

In a specific modulation mode, a bit data flow is transmitted by mapping multiple bits into one symbol so that the data flow becomes a transmission symbol. The data flow speed of the transmission symbol is the symbol rate. The QPSK modulation mode is to map two bits into one symbol. If the rate of the bit data flow is 100 Mbit/s and the modulation mode is QPSK, the symbol rate is 100/2=50 Msymbol/s.

The 2× symbol rate data flow undergoes frame synchronization adjustment. Specifically, the frame synchronization adjustment includes symbol clock recovery, frame header alignment, and other functions. The data flow received before the frame synchronization adjustment is a 2× symbol rate data flow, and the output data flow is also a 2× symbol rate data flow.

After the frame synchronization adjustment, the data flow undergoes balancing, where the balancing is intended for distortion compensation for the data flow. The distortion refers mainly to linear distortion such as selective fading caused by channel flatness, group delay fluctuation, and channel multi-path, and the balancing can compensate for the distortion. The balancing is unable to compensate for non-linear distortion of the power amplifier. In practical application, the balancing can be implemented by an adaptive digital filter. The balancing works under a 2× symbol rate, that is, a balanced data flow is a 2× symbol rate data flow.

The balanced data flow undergoes data extraction. After data extraction, a 2× symbol rate data flow is converted into a 1× symbol rate data flow. In hard decision processing, that is, in determining the position on the constellation map, 1× symbol rate is required. Therefore, the 2× symbol rate data flow needs to be condensed into a 1× symbol rate data flow. Optionally, the 2× symbol rate data flow may be condensed into the 1× symbol rate data flow by discarding alternate pieces of data and reserving odd-number data or even-number data.

It should be noted that at the time of obtaining the data flow, each piece of data is generally obtained twice. Although the data obtained in the two attempts differs, the data of the data flow has been synchronized by the data flow clock in the frame synchronization processing. Therefore, the extracted data is the data at a transition point and has no impact on data recovery.

Hard decision about the constellation point is performed for the symbol corresponding to the 1× symbol rate data flow that has undergone the data extraction. The received data flow is checked against the position of each constellation point on the corresponding constellation map to determine the position of the symbol corresponding to the modulation mode on the constellation map, and at the same time, a signal-to-noise ratio (Signal Noise Ratio, SNR) of the signal is obtained according to the difference between the position of the actual constellation point and the position of the ideal constellation point. The receiving system can obtain a high SNR after frame synchronization adjustment, balancing, and hard decision. The high signal-to-noise ratio means that the point of the data flow on the constellation map approximates to the ideal point. The actual constellation point is a constellation point corresponding to a symbol on the constellation map, where the symbol corresponds to the data flow; and the ideal constellation point is a constellation point corresponding to a symbol on the constellation map, where the symbol corresponds to a specific modulation module, and the ideal constellation point may be understood as a standard constellation point. The 1× symbol rate data flow obtained after the hard decision is the first data flow in this embodiment.

Step 402: Perform interpolation into the first data flow to obtain a second data flow.

QPSK is a digital modulation mode. In the modulation modes of digital signals, QPSK is a common satellite digital signal modulation mode characterized by a high spectrum usage and high interference resistance. As shown in FIG. 2, FIG. 2(1) illustrates the position of the symbol corresponding to the QPSK on the constellation map, and FIG. 2(2) illustrates the time domain map corresponding to the QPSK modulation signal. Evidently, the amplitude on the time domain does not differ between the QPSK modulation signals. Consequently, the power amplification response under different input amplitudes cannot be determined, and the DPD non-linear distortion compensation coefficient cannot be calculated. Therefore, the first data flow needs to be processed so that the symbol corresponding to the processed data flow has a different amplitude on the time domain.

Specifically, interpolation is performed into the first data flow, that is, interpolation is performed into the first data flow of a 1× symbol rate to obtain the second data flow of a 2× symbol rate, and therefore, the symbol corresponding to the data flow that has undergone the interpolation has a different amplitude on the time domain. For example, a preset value is interpolated between every two data symbols in the first data flow of a 1× symbol rate, where the preset value may be 0.

Further, the data flow with the interpolated preset value undergoes an anti-aliasing filtering. The filtering bandwidth is equal to the symbol rate so as to filter out the interfering signals in the data flow that has undergone the interpolation.

The data flow at this time is a data flow with a high SNR after hard decision. Due to the interpolation filtering, the data flow at this time has both a symbol point and a transition point, where the amplitude differs between the transition point and the symbol point, thereby providing a basis for calculating the DPD distortion compensation coefficient. It should be noted that before the interpolation operation, a symbol point, from which real signal information can be extracted, exists in the first data flow; after completion of interpolation, a transition point, which is generated out of the interpolation, exists in the second data flow, where the transition point is located in a middle position between two adjacent symbol points in the time domain map. As shown in FIG. 3, a symbol point is denoted by a circle and a transition point is denoted by a triangle. In this way, on the time domain map corresponding to the QPSK modulation signal, the amplitude differs, which provides a basis for calculating the DPD non-linear distortion compensation coefficient.

Step 403: Receive a third data flow.

The third data flow is a 2× symbol rate data flow obtained after the 2× symbol rate QPSK modulation signal undergoes frame synchronization adjustment and balancing. Step 401 has given a detailed description about the frame synchronization adjustment and the balancing, which are not repeated in this step any further.

It should be noted that the order is not fixed between step 401 and step 403; that is, step 401 and step 402 may be performed before step 403, or step 403 may be performed before step 401 and step 402. Generally, on a chronological basis, step 403 is performed before step 401. However, for ease of description in this embodiment, the receiving of the first data flow is described first and then the receiving of the third data flow is described later.

Step 404: Remove the distortion compensation caused by the balancing onto data distortion in the third data flow to obtain real data distortion.

It should be noted that this step is optional. Optionally, de-balancing is performed for the third data flow, and therefore, the de-balanced data flow can reflect real distortion of the data, and a better capability of retrieving the DPD distortion coefficient can be obtained. The effect of the de-balancing is to remove the data distortion compensation applied in the balancing so that the frequency response used in the de-balancing is totally opposite to the frequency response used in the balancing.

Step 405: Perform delay alignment between the third data flow and the second data flow.

It should be noted that after step 403 is performed, step 405 may be performed directly, or, after step 403 is performed, step 404 is performed and then step 405 is performed.

Optionally, a delay difference between the third data flow and the second data flow is calculated; and delay alignment is performed between the third data flow and the second data flow according to the delay difference.

Before the DPD non-linear distortion compensation coefficient is calculated, delay alignment needs to be performed between the third data flow and the second data flow. Specifically, the delay difference between data flows is calculated, and then delay compensation is performed to align the delay between the two data flows.

Step 406: Calculate a data flow signal quality difference between the third data flow and the second data flow.

Optionally, determine an actual symbol point corresponding to the third data flow and an ideal symbol point corresponding to the second data flow after the delay alignment; and calculate a data flow signal quality difference between the actual symbol point and the ideal symbol point.

The balanced third data flow is distorted greatly, and the second data flow that has passed through the hard decision module and the interpolation and filtering module has a better SNR, and therefore has a low distortion. According to the signal quality difference between the two data flows, the error between the two data flows is extracted, and the error between the actual symbol point corresponding to the third data flow and the ideal point corresponding to the second data flow can be extracted.

The second data flow is used as basic data, or the third data flow is used as basic data, corresponding to the error at this symbol point (the symbol point or transition point of a different amplitude may correspond to the error information of this point), and the error caused by the power amplifier non-linear distortion can be extracted correctly, which is the data flow signal quality difference in this embodiment. It should be noted that the second data flow differs from the third data flow only in data performance, and both can be used as a basis for calculating the DPD non-linear distortion compensation coefficient.

Step 407: Obtain a DPD non-linear distortion compensation coefficient according to the data flow signal quality difference and the third data flow or the second data flow.

Optionally, a DPD non-linear distortion compensation coefficient may be calculated according to $C_n = C_{n-1} + \mu \cdot e^* \cdot x_i$, which is an iterative summation formula, where $C_n$ is a DPD non-linear distortion compensation coefficient in the current calculation cycle, $C_{n-1}$ is a DPD non-linear distortion compensation coefficient calculated in the previous calculation cycle, e is a data flow signal quality difference and may be a complex number, e* refers to calculating a conjugate value of the complex number, $x_i$ is a data flow, and, in this embodiment, $x_i$ is the second data flow or the third data flow.

After the DPD non-linear distortion compensation coefficient is obtained, the DPD non-linear distortion compensation coefficient is sent to a sending device, the sending device writes the obtained DPD non-linear distortion compensation coefficient into a DPD unit in the sending device, and the DPD unit converts the DPD non-linear distortion compensation coefficient into a data flow for implementing pre-distortion compensation. When the data flow is sent to a power amplifier in the sending device, the data flow can counteract the non-linear distortion of the power amplifier, thereby performing the non-linear distortion DPD compensation function of the power amplifier.

In the data processing method provided in the embodiment of the present invention, a value is interpolated into the first data flow to obtain a second data stream. Therefore, when the modulation mode is QPSK, the amplitude on the time domain differs between modulation signals, and then the DPD non-linear distortion compensation coefficient is calculated according to the received third data flow, so that the DPD non-linear distortion compensation coefficient in QPSK mode can be obtained by using the second data flow and the third data flow.

Embodiment 2

Figure 7:
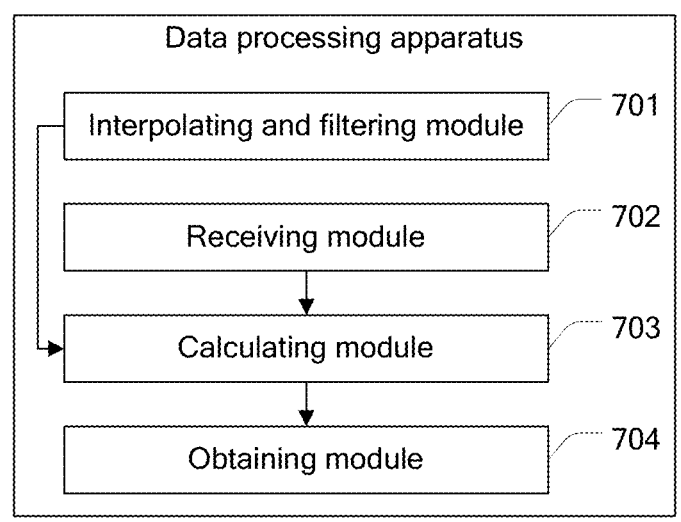
FIG. 7 is a structural block diagram of a data processing apparatus according to Embodiment 2 of the present invention.

This embodiment of the present invention provides a data processing apparatus. As shown in FIG. 7, the apparatus includes an interpolating and filtering module 701, a receiving module 702, a calculating module 703, and an obtaining module 704.

The interpolating and filtering module 701 is configured to receive a first data flow, and perform interpolation into the first data flow to obtain a second data flow.

Optionally, the first data flow is a 1× symbol rate data flow obtained after a 2× symbol rate quadrature phase shift keying (QPSK) modulation signal undergoes frame synchronization adjustment, balancing, data extraction, and position determining on the constellation map.

The receiving module 702 is configured to receive a third data flow.

The third data flow is a 2× symbol rate data flow obtained after the 2× symbol rate QPSK modulation signal undergoes frame synchronization adjustment and balancing.

The calculating module 703 is configured to calculate a data flow signal quality difference between the third data flow and the second data flow.

The obtaining module 704 is configured to obtain a DPD non-linear distortion compensation coefficient according to the data flow signal quality difference and the third data flow or the second data flow.

Optionally, according to the LMS algorithm principles, the DPD non-linear distortion compensation coefficient can be calculated corresponding to the data flow signal quality difference between the third data flow and the second data flow by using the second data flow or the third data flow as fundamental data. It should be noted that the second data flow differs from the third data flow only in data performance, and both can be used as a basis for calculating the DPD non-linear distortion compensation coefficient.

QPSK is a digital modulation mode. In the modulation modes of digital signals, QPSK is a common satellite digital signal modulation mode characterized by a high spectrum usage and high interference resistance. As shown in FIG. 2, FIG. 2(1) illustrates the position of the symbol corresponding to the QPSK on the constellation map, and FIG. 2(2) illustrates the time domain map corresponding to the QPSK modulation signal. Evidently, the amplitude on the time domain does not differ between the QPSK modulation signals. Consequently, the power amplification response under different input amplitudes cannot be determined, and the DPD non-linear distortion compensation coefficient cannot be calculated. Therefore, the first data flow needs to be processed so that the symbol corresponding to the processed data flow has a different amplitude on the time domain. Further, optionally, as shown in FIG. 8, the interpolating and filtering module 701 is configured to perform interpolation into the first data flow of a 1× symbol rate to obtain the second data flow of a 2× symbol rate.

Figure 8:
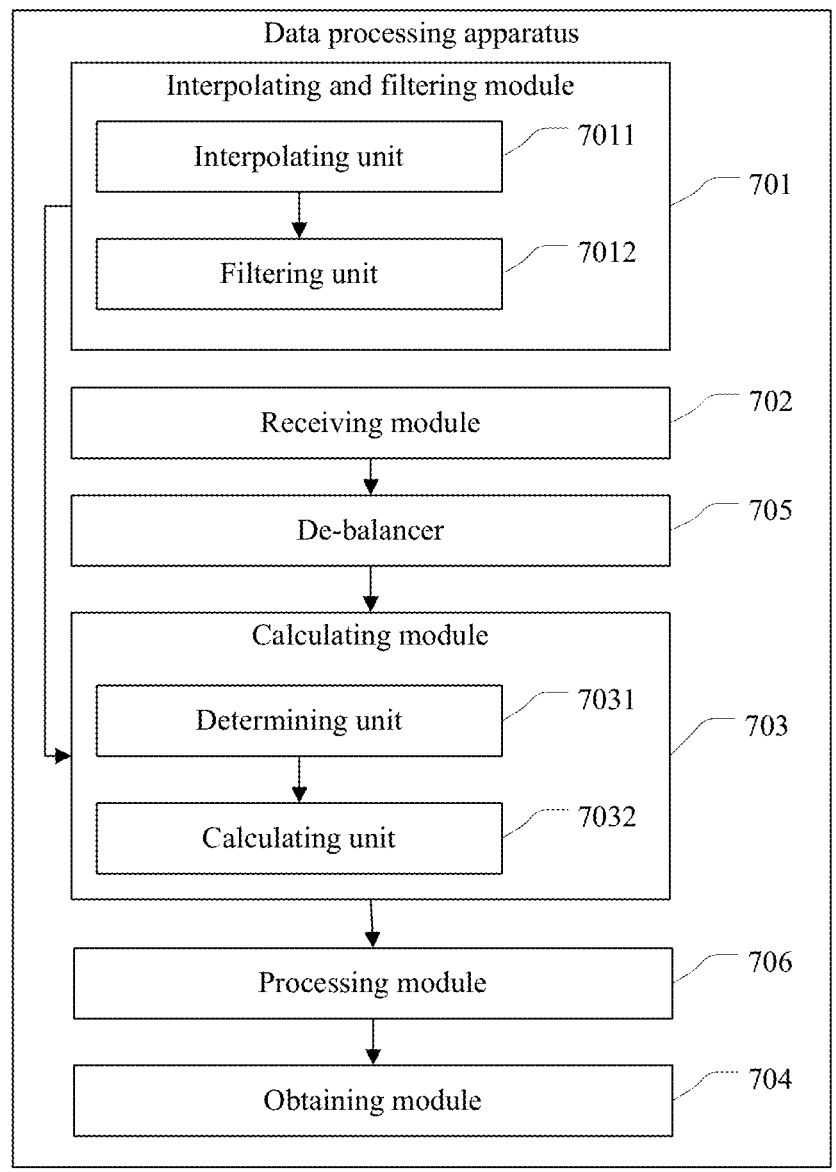
FIG. 8 is a structural block diagram of another data processing apparatus according to Embodiment 2 of the present invention.

Further, optionally, as shown in FIG. 8, the interpolating and filtering module 701 includes an interpolating unit 7011 and a filtering unit 7012.

The interpolating unit 7011 is configured to interpolate a preset value between every two data symbols in the first data flow of a 1× symbol rate, where the preset value may be 0.

The filtering unit 7012 is configured to perform anti-aliasing filtering for the data flow with the interpolated preset value to obtain the second data flow of a 2× symbol rate.

Further, optionally, as shown in FIG. 8, the apparatus may further include a de-balancer 705.

After the receiving module 702 receives the third data flow, and before the calculating module 703 calculates a data flow signal quality difference between the third data flow and the second data flow, the de-balancer 705 is configured to remove the distortion compensation caused by the balancing onto data distortion in the third data flow to obtain real data distortion.

Optionally, the de-balancer 705 processes the third data flow, and therefore, the data flow processed by the de-balancer 705 can reflect real distortion of the data, and a better capability of retrieving the DPD distortion coefficient can be obtained. The effect of the de-balancer 705 is to remove the data distortion compensation applied in the balancing so that the frequency response of the de-balancer is totally opposite to the frequency response of the device used in the balancing.

Further, optionally, as shown in FIG. 8, the apparatus further includes a processing module 706.

Before the calculating module 703 calculates a data flow signal quality difference between the third data flow and the second data flow, the calculating module 703 is further configured to calculate a delay difference between the third data flow and the second data flow; and the processing module 706 is configured to perform delay alignment between the third data flow and the second data flow according to the delay difference.

Further, optionally, as shown in FIG. 8, the calculating module 703 includes a determining unit 7031 and a calculating unit 7032.

The determining unit 7031 is configured to determine an actual symbol point corresponding to the third data flow and an ideal symbol point corresponding to the second data flow after the delay alignment.

The calculating unit 7032 is configured to calculate a data flow signal quality difference between the actual symbol point and the ideal symbol point.

The third data flow sent from the balancer is distorted greatly, and the second data flow that has passed through the hard decision module and the interpolation and filtering module has a better SNR, and therefore has a low distortion. According to the signal quality difference between the two data flows, the error between the two data flows is extracted, and the error between the actual symbol point corresponding to the third data flow and the ideal point corresponding to the second data flow can be extracted.

It should be noted that in the apparatus shown in FIG. 7 or 8, because the detailed implementation processes of the modules and the information exchange between the modules are based on the same conception as the method embodiment of the present invention, reference may be made to the method embodiment, and no repeated description is given here any further.

In the data processing apparatus provided in the embodiment of the present invention, the interpolating and filtering module is configured to receive the first data flow, and interpolate a value into the first data flow to obtain the second data flow; the calculating module is configured to receive the third data flow, and calculate the data flow signal quality difference between the third data flow and the second data flow; and the obtaining module is configured to obtain the DPD non-linear distortion compensation coefficient according to the data flow signal quality difference and the third data flow or the second data flow. Therefore, the value is interpolated into the first data flow to obtain the second data flow, and, when the modulation mode is QPSK, the amplitude on the time domain differs between modulation signals, and then the DPD non-linear distortion compensation coefficient is calculated according to the received third data flow, so that the DPD non-linear distortion compensation coefficient in QPSK mode can be obtained by using the second data flow and the third data flow.

Figure 9:
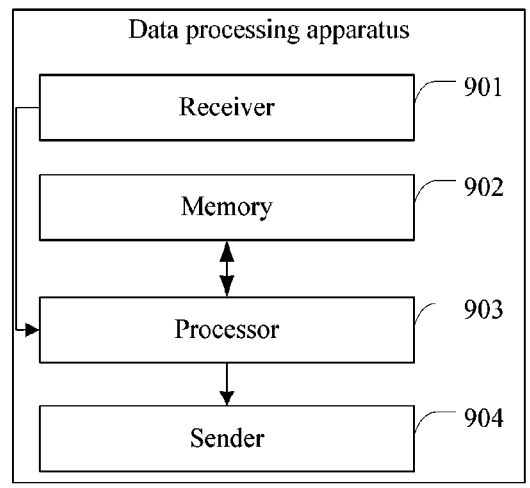
FIG. 9 is a structural block diagram of still another data processing apparatus according to Embodiment 2 of the present invention.

An embodiment of the present invention further provides a data processing apparatus. As shown in FIG. 9, the apparatus includes a receiver 901, a memory 902, a processor 903, and a sender 904.

The receiver 901 is configured to receive a first data flow and receive a third data flow.

Optionally, the first data flow is a 1× symbol rate data flow obtained after a 2× symbol rate quadrature phase shift keying QPSK modulation signal undergoes frame synchronization adjustment, balancing, data extraction, and position determining on the constellation map. The third data flow is a 2× symbol rate data flow obtained after the 2× symbol rate QPSK modulation signal undergoes frame synchronization adjustment and balancing.

The memory 902 is configured to store information that includes programs and routines.

The processor 903 is coupled with the memory, the receiver, and the sender, and is configured to control execution of the programs and routines, specifically including: performing interpolation into a first data flow to obtain a second data flow; calculating a data flow signal quality difference between the third data flow and the second data flow; and obtaining a digital pre-distortion DPD non-linear distortion compensation coefficient according to the data flow signal quality difference and the third data flow or the second data flow.

Further, optionally, the performing interpolation into a first data flow to obtain a second data flow includes: performing interpolation into the first data flow of a 1× symbol rate to obtain the second data flow of a 2× symbol rate. Specifically, a preset value is interpolated between every two data symbols in the first data flow of a 1× symbol rate, where the preset value may be 0; and anti-aliasing filtering is performed for the data flow with the interpolated preset value to obtain the second data flow of a 2× symbol rate.

Further, optionally, the processor 903 is further configured to: after receiving the third data flow and before calculating the data flow signal quality difference between the third data flow and the second data flow, remove the distortion compensation caused by the balancing onto data distortion in the third data flow to obtain real data distortion.

Further, optionally, the processor 903 is further configured to: after receiving the third data flow and before calculating the data flow signal quality difference between the third data flow and the second data flow, calculate a delay difference between the third data flow and the second data flow; and perform delay alignment between the third data flow and the second data flow according to the delay difference.

Specifically, the calculating, by the processor 903, a data flow signal quality difference between the third data flow and the second data flow, includes: determining an actual symbol point corresponding to the third data flow and an ideal symbol point corresponding to the second data flow after the delay alignment; and calculating a data flow signal quality difference between the actual symbol point and the ideal symbol point.

The sender 904 is configured to send the DPD non-linear distortion compensation coefficient obtained by the processor 903.

It should be noted that in the apparatus shown in FIG. 9, because the detailed implementation processes of the modules and the information exchange between the modules are based on the same conception as the method embodiment of the present invention, reference may be made to the method embodiment, and no repeated description is given here any further.

In the data processing apparatus provided in the embodiment of the present invention, the processor interpolates a value into the first data flow to obtain a second data stream. Therefore, when the modulation mode is QPSK, the amplitude on the time domain differs between modulation signals, and then the DPD non-linear distortion compensation coefficient is calculated according to the received third data flow, so that the DPD non-linear distortion compensation coefficient in QPSK mode can be obtained by using the second data flow and the third data flow.

Figure 10:
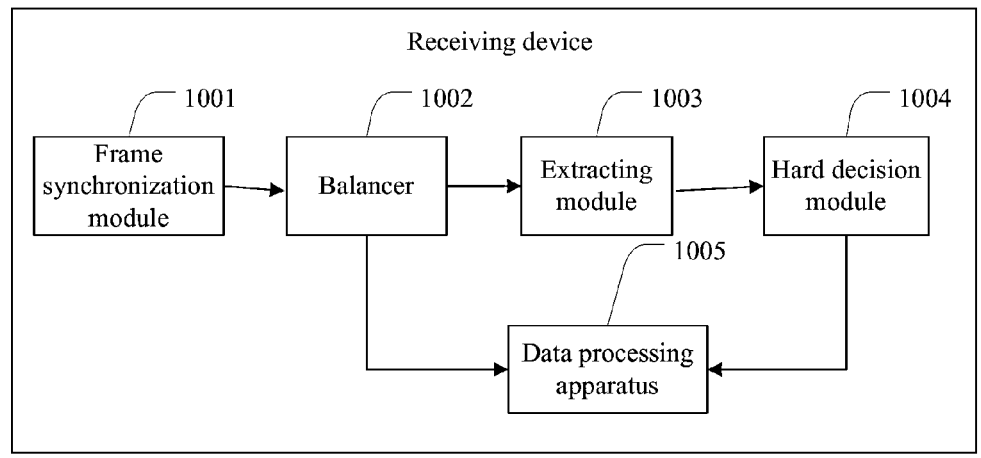
FIG. 10 is a structural block diagram of a receiving device according to Embodiment 2 of the present invention.
Figure 11:
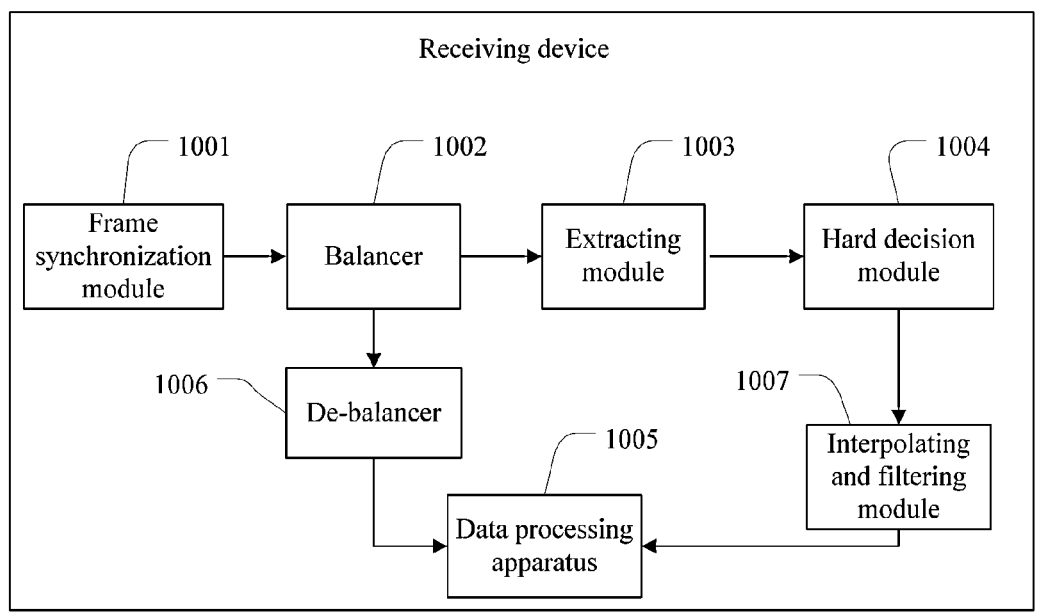
FIG. 11 is a structural block diagram of another receiving device according to Embodiment 2 of the present invention.

An embodiment of the present invention provides a receiving device. As shown in FIG. 10 or 11, the receiving device includes at least a frame synchronization module 1001, a balancer 1002, an extracting module 1003, a hard decision module 1004, and a data processing apparatus 1005.

The frame synchronization module 1001 is configured to receive a digitalized data flow, where the data flow is a QPSK modulation signal of a 2× symbol rate, and perform symbol clock recovery and frame header alignment for the received data flow.

In a specific modulation mode, a bit data flow is transmitted by mapping multiple bits into one symbol so that the data flow becomes a transmission symbol. The data flow speed of the transmission symbol is the symbol rate. The QPSK modulation mode is to map two bits into one symbol. If the rate of the bit data flow is 100 Mbit/s and the modulation mode is QPSK, the symbol rate is 100/2=50 Msymbol/s.

The data input by the frame synchronization module is a 2× symbol rate data flow, and the data flow output by it is also a 2× symbol rate data flow.

The data flow adjusted by the frame synchronization module 1001 enters the balancer 1002, and in the balancer 1002, distortion compensation is performed for the data flow. The distortion refers mainly to linear distortion such as selective fading caused by channel flatness, group delay fluctuation, and channel multi-path, and the balancer 1002 can compensate for the distortion. The balancer 1002 is unable to compensate for non-linear distortion of the power amplifier. The balancer 1002 may be implemented by an adaptive digital filter, and this module works under a 2× symbol rate, that is, the data flow processed by the balancer 1002 is a 2× symbol rate data flow.

The data flow processed by the balancer 1002 enters the extracting module 1003. In the extracting module 1003, the data flow undergoes extraction so that the 2× symbol rate data flow is converted into a 1× symbol rate data flow. When the hard decision module 1004 determines the position on the constellation map, the hard decision module 1004 needs to work under a 1× symbol rate. Therefore, the extracting module 1003 needs to perform extraction to condense the 2× symbol rate data flow into a 1× symbol rate data flow. Optionally, the 2× symbol rate data flow may be condensed into the 1× symbol rate data flow by discarding alternate pieces of data and reserving odd-number data or even-number data.

It should be noted that at the time of obtaining the data flow, each piece of data is generally obtained twice. Although the data obtained in the two attempts differs, the data of the data flow has been synchronized by the data flow clock in the frame synchronization module 1001. Therefore, the data extracted by the extracting module 1003 is the data at a transition point and has no impact on data recovery.

After undergoing the data extraction performed by the extracting module 1003, the 1× symbol rate data flow enters the hard decision module 1004, and the hard decision module 1004 performs hard decision of the constellation point for the symbol corresponding to the data flow. The hard decision module 1004 checks the received data flow against the position of each constellation point on the corresponding constellation map to determine the position of the symbol corresponding to the modulation mode on the constellation map, and at the same time, obtains a signal-to-noise ratio (Signal Noise Ratio, SNR) of the signal according to the difference between the position of the actual constellation point and the position of the ideal constellation point. The receiving system can obtain a high SNR after frame synchronization, balancing, and hard decision. The high signal-to-noise ratio means that the point of the data flow on the constellation map approximates to the ideal point. The actual constellation point is a constellation point corresponding to a symbol on the constellation map, where the symbol corresponds to the data flow; and the ideal constellation point is a constellation point corresponding to a symbol on the constellation map, where the symbol corresponds to a specific modulation module, and the ideal constellation point may be understood as a standard constellation point. The 1× symbol rate data flow obtained after being processed by the hard decision module is the first data flow in this embodiment.

The data processing apparatus 1005 is configured to: receive the first data flow, and interpolate a value into the first data flow to obtain the second data flow; receive a third data flow, and calculate a data flow signal quality difference between the third data flow and the second data flow; and obtain a DPD non-linear distortion compensation coefficient according to the data flow signal quality difference and the third data flow or the second data flow.

It should be noted that the interpolating and filtering module 1007 in the data processing apparatus may be located in the data processing apparatus as a module of the data processing apparatus, as shown in FIG. 10, or the interpolating and filtering module 1007 may be a stand-alone module, as shown in FIG. 11. The de-balancer 1006 may be located in the data processing apparatus as a module of the data processing apparatus, as shown in FIG. 10, or the de-balancer 1006 may be a stand-alone module, as shown in FIG. 11.

The data processing apparatus 1005 may be the apparatus illustrated in FIG. 7, FIG. 8, or FIG. 9. For details, see the descriptions about FIG. 7, FIG. 8 or FIG. 9, and no repeated description is given herein.

The receiving device provided in the embodiment of the present invention obtains the first data flow after frame synchronization adjustment, balancing, data extraction, and position determining on the constellation map, and interpolates a value into the first data flow to obtain the second data flow; obtains a third data flow after frame synchronization adjustment and balancing, and calculates the data flow signal quality difference between the third data flow and the second data flow; and obtains the DPD non-linear distortion compensation coefficient according to the data flow signal quality difference and the third data flow or the second data flow, and therefore, the DPD non-linear distortion compensation coefficient can be obtained in QPSK mode.

Figure 5:
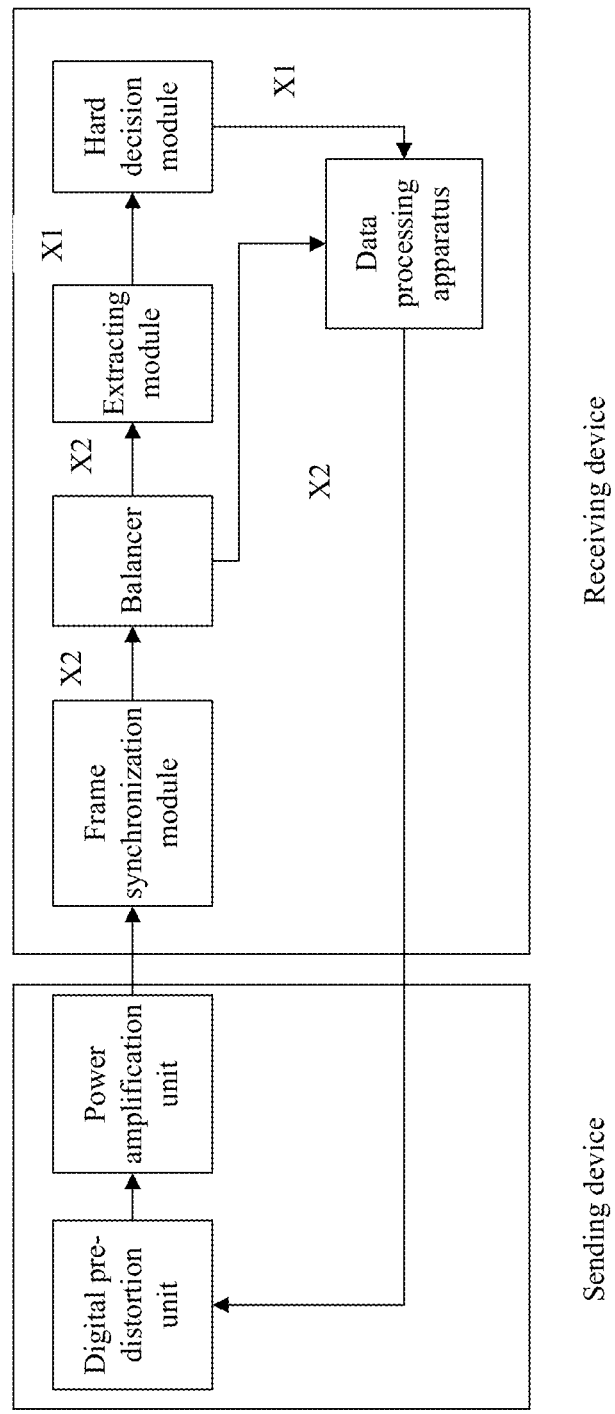
FIG. 5 is a schematic diagram of a data processing system according to Embodiment 1 of the present invention.
Figure 6:
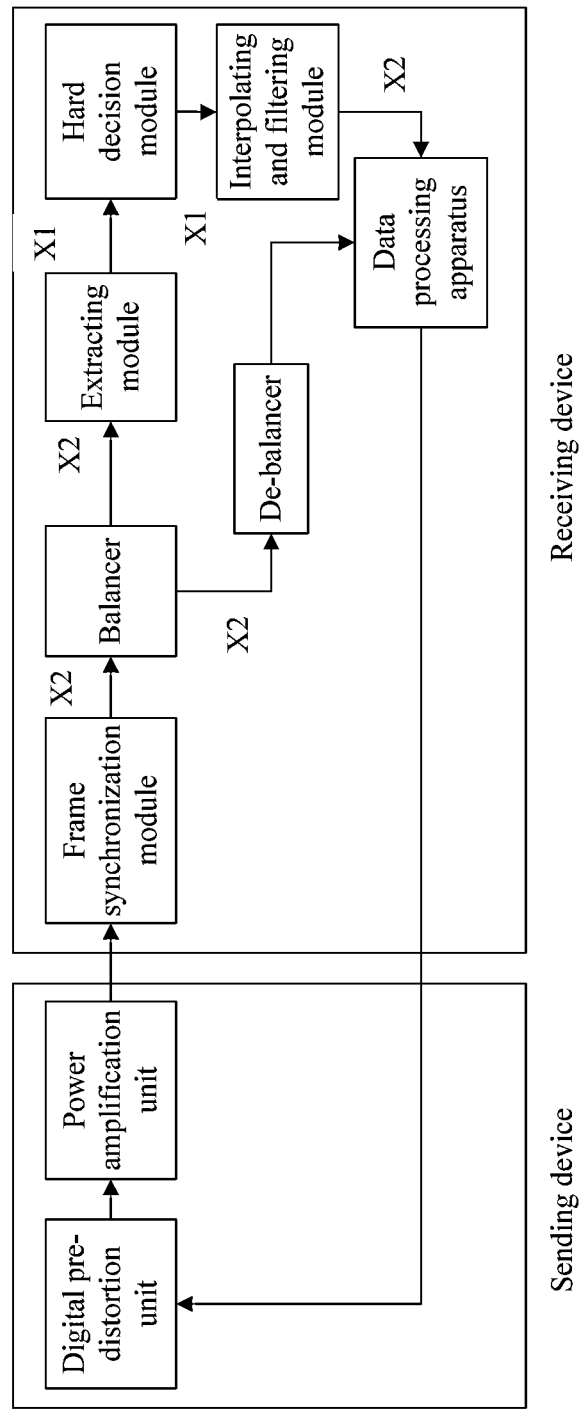
FIG. 6 is a schematic diagram of another data processing system according to Embodiment 1 of the present invention.

An embodiment of the present invention provides a data processing system. As shown in FIG. 5 or FIG. 6, the system includes at least a sending device and a receiving device.

The receiving device may be the receiving device shown in FIG. 10 or FIG. 11. For details, reference may be made to the receiving device illustrated in FIG. 10 or FIG. 11, and no repeated description is given herein. The receiving device obtains the DPD non-linear distortion compensation coefficient and sends the DPD non-linear distortion compensation coefficient to the sending device.

the sending device is configured to receive a DPD non-linear distortion compensation coefficient sent by the receiving device, convert the DPD non-linear distortion compensation coefficient into a data flow for implementing pre-distortion compensation, amplify power of the data flow, and output the amplified data flow. Specifically, the DPD unit in the sending device converts the received DPD non-linear distortion compensation coefficient into a data flow for implementing pre-distortion compensation, and sends the data flow to the power amplifier; when the data flow is sent to a power amplifier, the data flow can counteract the non-linear distortion of the power amplifier, thereby performing the non-linear distortion DPD compensation function of the power amplifier.

In the data processing system provided in the embodiment of the present invention, the receiving device can obtain the DPD non-linear distortion compensation coefficient in QPSK mode and send the DPD non-linear distortion compensation coefficient to the sending device, thereby implementing the non-linear distortion DPD compensation function of the power amplifier.

It should be noted that the described apparatus embodiments are merely exemplary, the units described as separate parts may be physically separated or not, and parts displayed as units may be physical units or not, that is, may be placed in one location or distributed on a plurality of network elements. Part of or all of the modules may be selected according to actual needs to achieve the objectives of the solutions of the embodiments. Persons of ordinary skill in the art may understand and implement the embodiments without making creative efforts.

According to the descriptions of the foregoing implementation modes, persons skilled in the art can clearly understand that the present invention can be implemented by software in addition to necessary universal hardware, or by dedicated hardware including dedicated integrated circuits, dedicated CPUs, dedicated memories, and dedicated components, but, in most circumstances, the former is preferred. Based on such understandings, the essence of the technical solutions of the present invention or the part that makes contributions to the prior art can be embodied in a software product. The computer software product may be stored in a readable storage medium such as a computer floppy disk, a USB flash drive, a removable hard disk, a read-only memory (ROM, Read-Only Memory), a random access memory (RAM, Random Access Memory), a magnetic disk, or an optical disc, where the storage medium incorporates several instructions causing a computer device (such as a personal computer, a server, or a network device) to perform the method specified in each embodiment of the present invention.

The embodiments in this specification are all described in a progressive manner, mutual reference may be made to the same or similar part of the embodiments, and each embodiment focuses on differences from other embodiments. In particular, the apparatus and system embodiments are basically similar to the method embodiment and are therefore described briefly, and reference may be made to the corresponding part in the description of the method embodiment.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data processing method, comprising:
    receiving, by a receiver, a first data flow, wherein the first data flow is a 1× symbol rate data flow obtained after a 2× symbol rate quadrature phase shift keying (QPSK) modulation signal undergoes frame synchronization adjustment, balancing, data extraction, and constellation position determining;
    performing interpolation, by the receiver, into the first data flow to obtain a second data flow;
    receiving, by the receiver, a third data flow, wherein the third data flow is a 2× symbol rate data flow obtained after the 2× symbol rate QPSK modulation signal undergoes frame synchronization adjustment and balancing;
    calculating, by the receiver, a data flow signal quality difference between the third data flow and the second data flow;
    obtaining, by the receiver, a digital pre-distortion (DPD) non-linear distortion compensation coefficient according to the data flow signal quality difference and the third data flow or the second data flow.

2. The method according to claim 1, wherein the performing interpolation into the first data flow to obtain the second data flow comprises:
    performing interpolation, by the receiver, into the first data flow of a 1× symbol rate to obtain the second data flow of a 2× symbol rate.

3. The method according to claim 2, wherein the performing interpolation into the first data flow to obtain the second data flow comprises:
    interpolating, by the receiver, a preset value between every two data symbols in the first data flow of the 1× symbol rate; and
    performing anti-aliasing filtering, by the receiver, for the data flow with the interpolated preset value to obtain the second data flow of the 2× symbol rate.

4. The method according to claim 1, wherein after receiving the third data flow and before calculating the data flow signal quality difference between the third data flow and the second data flow, the method further comprises:
    removing, by the receiver, the distortion compensation caused by balancing onto data distortion in the third data flow to obtain real data distortion.

5. The method according to claim 1, wherein after receiving the third data flow and before calculating the data flow signal quality difference between the third data flow and the second data flow, the method further comprises:
    calculating, by the receiver, a delay difference between the third data flow and the second data flow; and
    performing delay alignment, by the receiver, between the third data flow and the second data flow according to the delay difference.

6. The method according to claim 5, wherein the calculating the data flow signal quality difference between the third data flow and the second data flow comprises:
    determining, by the receiver, an actual symbol point corresponding to the third data flow and an ideal symbol point corresponding to the second data flow after the delay alignment; and
    calculating, by the receiver, a data flow signal quality difference between the actual symbol point and the ideal symbol point.

7. A data processing apparatus, comprising:
an interpolating and filtering circuit, configured to receive a first data flow, wherein the first data flow is a 1× symbol rate data flow obtained after a 2× symbol rate quadrature phase shift keying (QPSK) modulation signal undergoes frame synchronization adjustment, balancing, data extraction, and constellation position determining, and to perform interpolation into the first data flow to obtain a second data flow;
a receiving circuit, configured to receive a third data flow, wherein the third data flow is a 2× symbol rate data flow obtained after the 2× symbol rate QPSK modulation signal undergoes frame synchronization adjustment and balancing;
a calculating circuit, configured to calculate a data flow signal quality difference between the third data flow and the second data flow; and
an obtaining circuit, configured to obtain a digital pre-distortion (DPD) non-linear distortion compensation coefficient according to the data flow signal quality difference and the third data flow or the second data flow.

8. The apparatus according to claim 7, wherein:
the interpolating and filtering circuit is specifically configured to perform interpolation into the first data flow of a 1× symbol rate to obtain the second data flow of a 2× symbol rate.

9. The apparatus according to claim 8, wherein the interpolating and filtering module comprises:
an interpolating circuit, configured to interpolate a preset value between every two data symbols in the first data flow of the 1× symbol rate; and
a filtering circuit, configured to perform anti-aliasing filtering for the data flow with the interpolated preset value to obtain the second data flow of the 2× symbol rate.

10. The apparatus according to claim 7, further comprising:
a de-balancer, configured to remove the distortion compensation caused by balancing onto data distortion in the third data flow to obtain real data distortion.

11. The apparatus according to claim 7, wherein:
the calculating circuit is further configured to calculate a delay difference between the third data flow and the second data flow; and
the apparatus further comprises a processing circuit, configured to perform delay alignment between the third data flow and the second data flow according to the delay difference.

12. The apparatus according to claim 11, wherein the calculating circuit comprises:
a determining circuit, configured to determine an actual symbol point corresponding to the third data flow and an ideal symbol point corresponding to the second data flow after the delay alignment; and
a calculating sub circuit, configured to calculate a data flow signal quality difference between the actual symbol point and the ideal symbol point.

13. A receiving device, comprising at least a frame synchronization circuit, a balancer, an extracting circuit, a hard decision circuit, and a data processing apparatus, wherein:
the frame synchronization circuit is configured to perform symbol clock recovery and frame header alignment for a received data flow;
the balancer is configured to perform distortion compensation for the data flow processed by the frame synchronization module;
the extracting circuit is configured to perform data extraction for the data flow processed by the balancer;
the hard decision circuit is configured to determine a constellation point for a symbol corresponding to the data flow processed by the extracting module to obtain the first data flow; and
the data processing apparatus is configured to:
receive a first data flow, wherein the first data flow is a 1× symbol rate data flow obtained after a 2× symbol rate quadrature phase shift keying (QPSK) modulation signal undergoes frame synchronization adjustment, balancing, data extraction, and constellation position determining, and to perform interpolation into the first data flow to obtain a second data flow;
receive a third data flow, wherein the third data flow is a 2× symbol rate data flow obtained after the 2× symbol rate QPSK modulation signal undergoes frame synchronization adjustment and balancing;
calculate a data flow signal quality difference between the third data flow and the second data flow; and
obtain a digital pre-distortion (DPD) non-linear distortion compensation coefficient according to the data flow signal quality difference and the third data flow or the second data flow.

14. A data processing system, comprising at least a sending device and a receiving device, wherein:
the sending device is configured to receive a DPD non-linear distortion compensation coefficient sent by the receiving device, convert the DPD non-linear distortion compensation coefficient into a data flow for implementing pre-distortion compensation, amplify power of the data flow, and output the amplified data flow; and
the receiving device is configured to:
perform symbol clock recovery and frame header alignment for a received data flow;
perform distortion compensation for the data flow processed by the frame synchronization module;
perform data extraction for the data flow processed by the balancer;
determine a constellation point for a symbol corresponding to the data flow processed by the extracting module to obtain the first data flow;
receive a first data flow, wherein the first data flow is a 1× symbol rate data flow obtained after a 2× symbol rate quadrature phase shift keying (QPSK) modulation signal undergoes frame synchronization adjustment, balancing, data extraction, and constellation position determining, and to perform interpolation into the first data flow to obtain a second data flow;
receive a third data flow, wherein the third data flow is a 2× symbol rate data flow obtained after the 2× symbol rate QPSK modulation signal undergoes frame synchronization adjustment and balancing;
calculate a data flow signal quality difference between the third data flow and the second data flow; and
obtain a digital pre-distortion (DPD) non-linear distortion compensation coefficient according to the data flow signal quality difference and the third data flow or the second data flow.

* * * * *